(12) United States Patent
Yokota et al.

(10) Patent No.: US 10,220,508 B2
(45) Date of Patent: Mar. 5, 2019

(54) ROBOT

(71) Applicant: Seiko Epson Corporation, Tokyo (JP)

(72) Inventors: Masato Yokota, Matsumoto (JP); Jun Sakurada, Shiojiri (JP); Akio Niu, Matsumoto (JP)

(73) Assignee: Seiko Epson Corporation (JP)

( * ) Notice: Subject to any disclaimer, the term of this patent is extended or adjusted under 35 U.S.C. 154(b) by 291 days.

(21) Appl. No.: 14/868,912

(22) Filed: Sep. 29, 2015

(65) Prior Publication Data

US 2016/0089778 A1 Mar. 31, 2016

(30) Foreign Application Priority Data

Sep. 30, 2014 (JP) .................................. 2014-200034

(51) Int. Cl.
| | |
|---|---|
| *B25J 9/06* | (2006.01) |
| *B25J 9/10* | (2006.01) |
| *B25J 18/00* | (2006.01) |
| *F16H 7/02* | (2006.01) |
| *B25J 9/08* | (2006.01) |

(52) U.S. Cl.
CPC . *B25J 9/06* (2013.01); *B25J 9/08* (2013.01); *B25J 9/104* (2013.01); *B25J 18/005* (2013.01); *F16H 7/02* (2013.01); *Y10S 901/21* (2013.01); *Y10S 901/27* (2013.01)

(58) Field of Classification Search
CPC ....... B25J 9/06; B25J 9/08; B25J 9/104; B25J 18/005
USPC ............ 74/490.01, 490.03, 490.04; 403/337; 285/412
See application file for complete search history.

(56) References Cited

U.S. PATENT DOCUMENTS

| | | | | |
|---|---|---|---|---|
| 807,662 | A | * | 12/1905 | Crowther |
| 1,352,102 | A | * | 9/1920 | Tatro .................. F16L 27/0841 285/18 |
| 1,526,336 | A | * | 2/1925 | Hart ........................ E03C 1/122 285/31 |
| 4,600,355 | A | * | 7/1986 | Johnson .................. B25J 9/046 248/558 |
| 4,984,959 | A | * | 1/1991 | Kato ........................ B25J 9/042 414/744.3 |
| 5,155,423 | A | * | 10/1992 | Karlen ....................... B25J 9/04 318/568.1 |
| 5,303,788 | A | * | 4/1994 | Muselli ..................... B25J 5/007 180/21 |

(Continued)

FOREIGN PATENT DOCUMENTS

| | | |
|---|---|---|
| JP | 60-009677 A | 1/1985 |
| JP | S60-135188 A | 7/1985 |

(Continued)

OTHER PUBLICATIONS

Extended European Search Report for Application No. EP 15 18 7086 dated Sep. 19, 2016 (6 pages).

*Primary Examiner* — William C Joyce
(74) *Attorney, Agent, or Firm* — Harness, Dickey & Pierce, P.L.C.

(57) ABSTRACT

A robot includes a curved arm including a first member, a second member, and a coupling member and bending in a longitudinal direction, the first member couples to a distal end of the coupling member in the longitudinal direction, and the second member couples to a base end of the coupling member in the longitudinal direction.

8 Claims, 7 Drawing Sheets

(56) References Cited

U.S. PATENT DOCUMENTS

| | | | |
|---|---|---|---|
| 6,957,832 B1 * | 10/2005 | Pannekoek | E04H 12/187 248/122.1 |
| D586,006 S * | 2/2009 | Pannekoek | D25/126 |
| 2006/0182601 A1 | 8/2006 | Nagai et al. | |
| 2011/0200406 A1 | 8/2011 | Lang et al. | |
| 2012/0198955 A1 | 8/2012 | Hayashi et al. | |
| 2014/0283642 A1 * | 9/2014 | Harada | B25J 18/04 74/490.05 |
| 2017/0239810 A1 * | 8/2017 | Bordegnoni | B25J 9/042 |

FOREIGN PATENT DOCUMENTS

| | | |
|---|---|---|
| JP | 04-226881 A | 8/1992 |
| JP | 05-237779 A | 9/1993 |
| JP | 2012-161868 A | 8/2012 |
| JP | 2013-233653 A | 11/2013 |

* cited by examiner

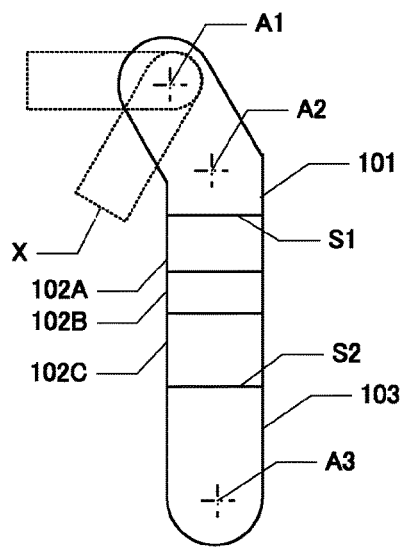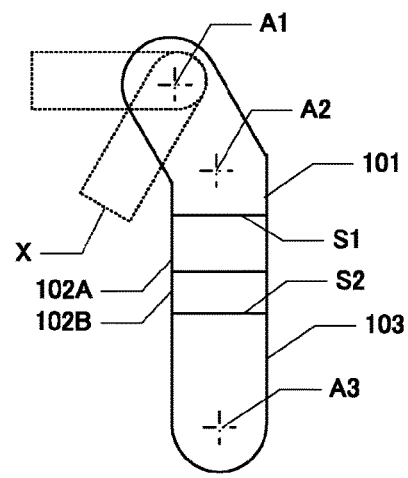
FIG. 7A  FIG. 7B
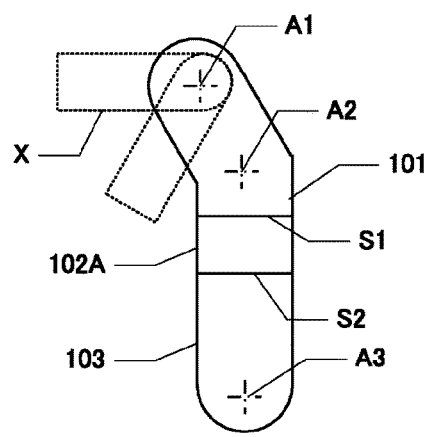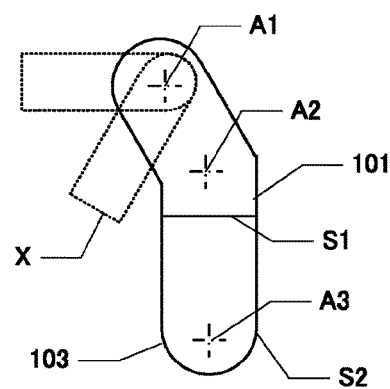
FIG. 7C  FIG. 7D

ROBOT

BACKGROUND

1. Technical Field

The present invention relates to a robot, and specifically to a structure of a manipulator of the robot.

2. Related Art

Patent Document 1 (JP-A-2013-233653) discloses a robot including a curved arm. The arm is curved, and thereby, an inaccessible region at the near side as seen from a base of the arm may be made smaller.

However, although the appropriate length of the arm varies in response to environment in which the robot is used, a robot having a curved arm length variable in response to use environment is not realized.

SUMMARY

An advantage of some aspects of the invention is to provide a robot having a curved arm length variable in response to use environment.

A robot according to an aspect of the invention includes a curved arm including a first member, a second member, and a coupling member, the curved arm being bent in a longitudinal direction, the first member being coupled to a distal end of the coupling member in the longitudinal direction, and the second member being coupled to a base end of the coupling member in the longitudinal direction.

According to the aspect of the invention, the length of the curved arm may be changed by exchange between coupling members having different lengths or attachment and detachment of the coupling member. The curve of the curved arm may be a curve in the longitudinal direction, and has e.g. an outer shape such that a rotation range of another arm rotatably supported by the curved arm may be wider. In this case, a projection image of the curved arm on a plane perpendicular to a rotation shaft of a distal end-side arm supported by the curved arm is bent in the longitudinal direction. Or, the curve may have an outer shape bending so that the rotation range of the curved arm may be wider. In this case, the projection image of the curved arm on a plane perpendicular to a rotation shaft of the curved arm is bent in the longitudinal direction. One or more of the first member, the second member, and the coupling member may be bent in the longitudinal direction of the curved arm, or the curved arm may be bent at boundaries between the first member, the second member, and the coupling member that are respectively not bent. Or, a linear arm may be an arm not being bent in the longitudinal direction, and, for example, the center line and the contour line extending in the longitudinal direction of the arm may be generally straight. Note that, regarding a distal end and a base end in the specification, an end mechanistically farther from the base supporting a manipulator is referred to as the distal end and an end closer to the base is referred to as the base end.

BRIEF DESCRIPTION OF THE DRAWINGS

The invention will be described with reference to the accompanying drawings, wherein like numbers reference like elements.

FIGS. 7A to 7D are schematic diagrams according to embodiments of the invention.

DESCRIPTION OF EXEMPLARY EMBODIMENTS

As below, embodiments of the invention will be explained with reference to the accompanying drawings. Note that the same signs are assigned to corresponding elements in the respective drawings, and overlapping explanation will be omitted.

1. Outline

Figure 1:
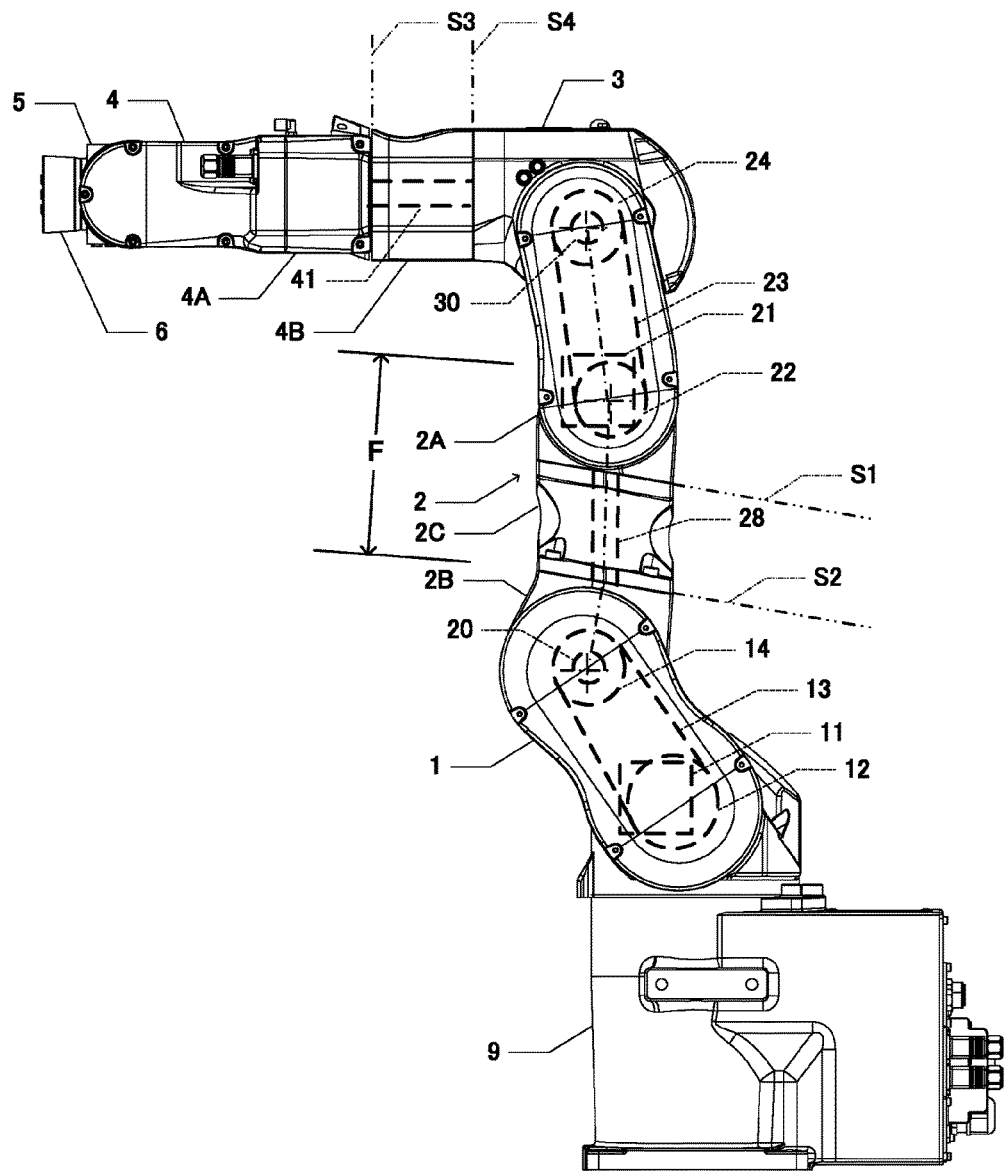
FIG. 1 is a side view according to an embodiment of the invention.

FIG. 1 shows a robot as one example of the invention. The robot of the example is a vertical articulated robot provided with a manipulator including a plurality of arms 1, 2, 3, 4, 5, 6. A hand (not shown) for operation of a work is attached to a distal end of the sixth arm 6. In the example, the second arm 2 is bent, and thereby, the rotation range of the third arm 3 is wider than that in the case where the second arm is not bent. Further, in order to change the lengths of the second arm 2 and the fourth arm 4 in response to use environment, one of a plurality of types of coupling members 2C having different lengths may be connected to the second arm 2 and one of a plurality of types of coupling members 4B having different lengths may be connected to the fourth arm 4.

2. Configuration

As shown in FIG. 1, the first arm 1 houses a motor 11, pulleys 12, 14, a belt 13, etc. for rotating the second arm 2 on the distal end. The driven pulley 14 rotates with a driven shaft 20 fixed to the second arm 2. The rotation shafts of the motor 11 and the pulleys 12, 14 are in parallel to one another, and perpendicular to the paper surface of FIG. 1.

The second arm 2 is supported rotatably with the driven shaft 20 (driven shaft at the base end side) by the first arm 1 at the base end side. The second arm 2 includes a first member 2A as a casing at the distal end side, a second member 2B as a casing at the base end side, and the coupling member 2C connected between the first member 2A and the second member 2B. The second member 2B is fixed to the driven shaft 20 rotatably supported by the first arm 1. The first member 2A houses a motor 21, pulleys 22, 24, and a belt 23 for rotating the third arm 3. The driven pulley 24 rotates with a driven shaft 30 (driven shaft at the distal end side) fixed to the third arm 3. The drive pulley 22 rotates with the motor 21. The belt 23 is looped over the driven pulley 24 and the drive pulley 22. The rotation shafts of the motor 21, the pulleys 22, 24, and the driven shaft 30 are in parallel to one another, and perpendicular to the paper surface of FIG. 1.

As shown by a dashed-dotted line in FIG. 1, the driven shaft 30, the drive pulley 22, and the driven shaft 20 are provided so that a surface containing line segments connecting the respective rotation shafts may be bent around the rotation shaft of the drive pulley 22. Accordingly, a contour line extending in the longitudinal direction of the projection image of the second arm 2 on a plane perpendicular to the rotation shaft of the third arm 3 is largely curved, and thereby, the rotation range of the third arm 3 may be made wider. Note that the rotation shafts of the motor 21 and the drive pulley 22 may be aligned or not.

Figure 2:
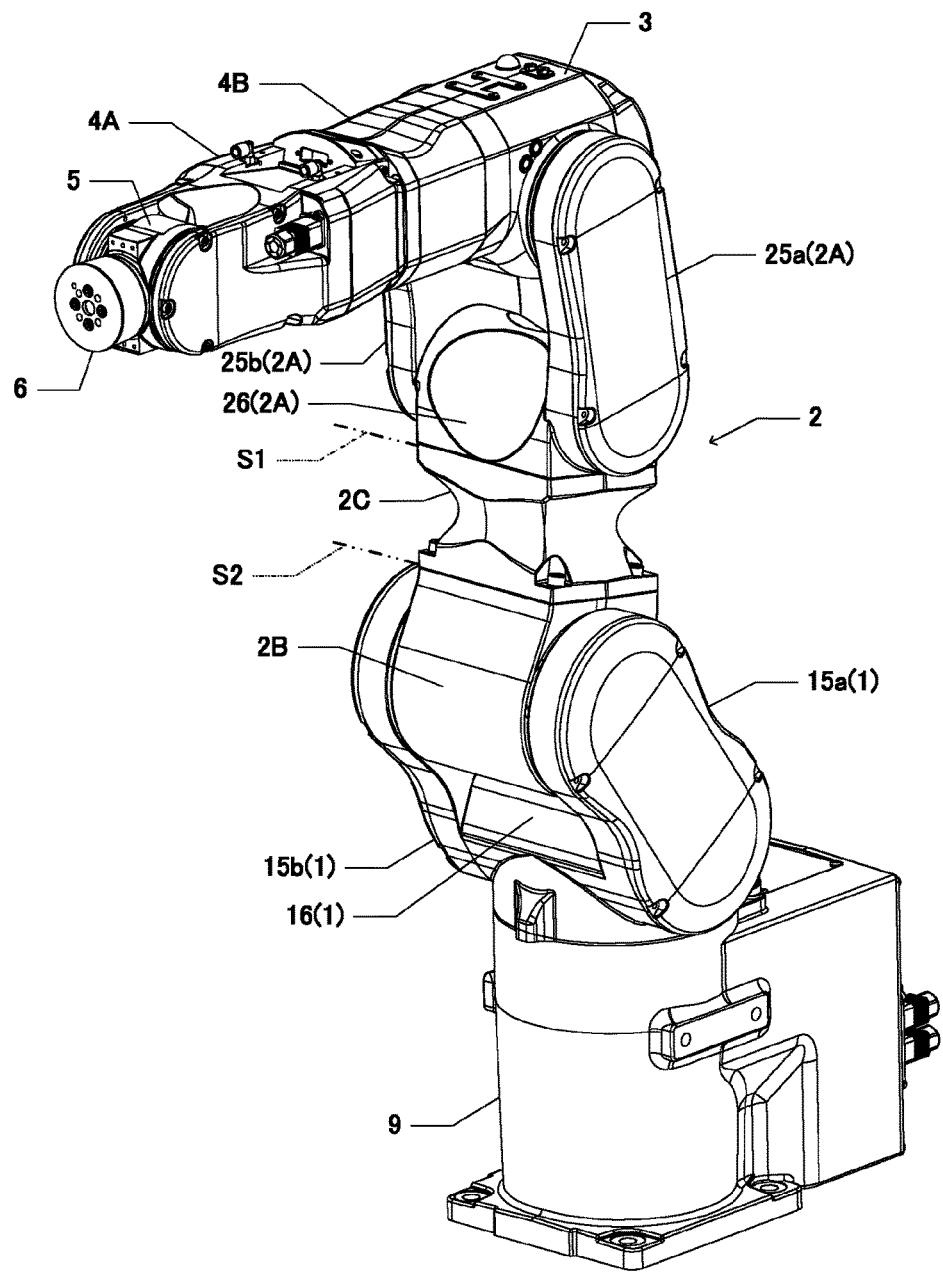
FIG. 2 is a perspective view according to the embodiment of the invention.

As shown in FIG. 2, the first member 2A includes a motor housing 26 housing the motor 21 and side housings 25a, 25b. The side housings 25a, 25b are fixed to both sides of the motor housing 26 and extend in the same direction from the motor housing 26. Further, the third arm 3 is rotatably supported between the side housings 25a, 25b. As shown in FIG. 1, one of the side housings 25a, 25b houses the drive pulley 22, the driven pulley 24, and the belt 23, and the other houses a bundle of connecting members such as electric wires and air tubes.

As shown in FIG. 1, of the side surfaces of the second arm 2, a region F facing the fourth arm 4 by the rotation of the third arm 3 is nearly in parallel to the plane connecting the rotation shaft of the second arm 2 (driven shaft 20) and the rotation shaft of the drive pulley 22. The side housings 25a, 25b extend to the outer side (to the left side in FIG. 1) of the plane nearly containing the region F, and thereby, the rotation shaft of the third arm 3 is located closer to the side of the plane nearly containing the region F (the left side in FIG. 1) than the rotation shaft of the drive pulley 22. As a result, the rotation range of the third arm 3 to the limit on which the fourth arm 4 and the second arm 2 come into contact may be wider.

The motor housing 26 forming the base end of the first member 2A couples to the distal end of coupling member 2C in the longitudinal direction of the second arm 2. Specifically, flat coupling surfaces are respectively formed on the distal ends of the motor housing 26 and the coupling member 2C, the coupling surfaces are opposed and coupled by screws, and thereby, the motor housing 26 and the coupling member 2C are integrally coupled.

The second member 2B couples to the base end of the coupling member 2C in the longitudinal direction of the second arm 2. Specifically, flat coupling surfaces are respectively formed on the base ends of the second member 2B and the coupling member 2C, the coupling surfaces are opposed and coupled by screws, and thereby, the second member 2B and the coupling member 2C are integrally coupled.

Figure 3:
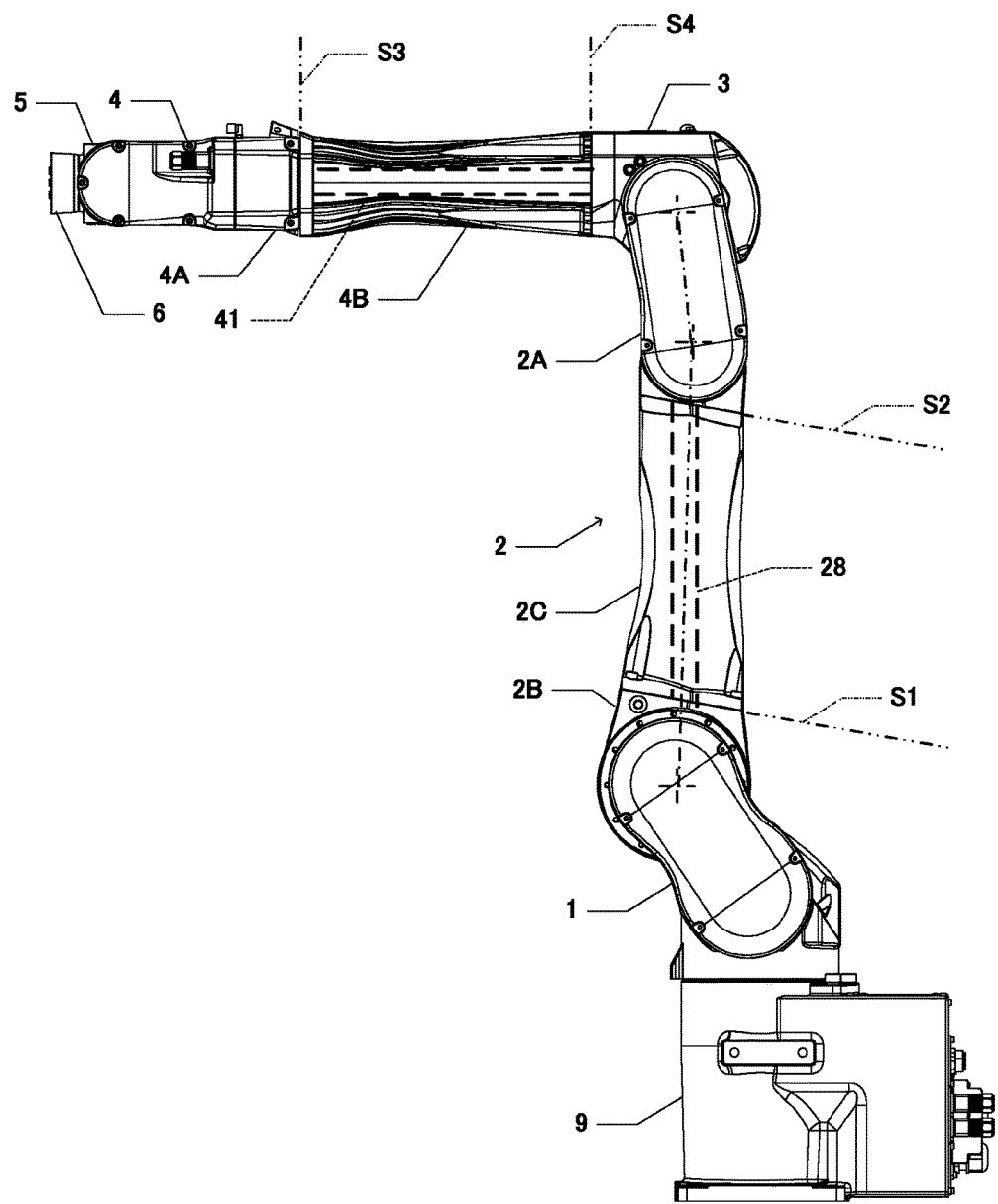
FIG. 3 is a side view according to the embodiment of the invention.
Figure 4:
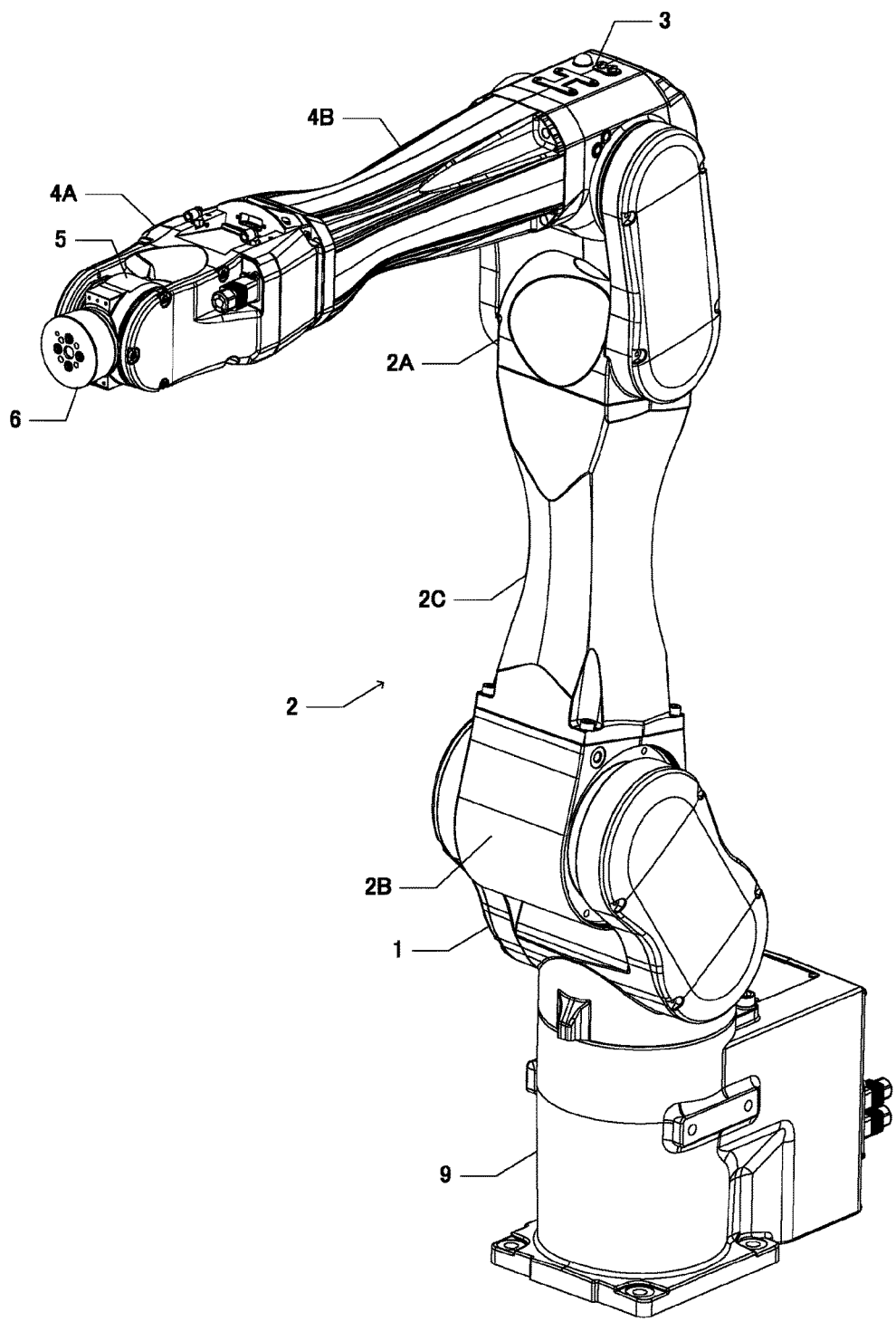
FIG. 4 is a perspective view according to the embodiment of the invention.

Two types of the coupling members 2C having different lengths may be coupled to the second arm 2. FIGS. 1 and 2 show a state in which the shorter coupling member 2C is coupled. FIGS. 3 and 4 show a state in which the longer coupling member 2C is coupled. As shown in FIGS. 1 and 3, a coupling surface S1 between the coupling member 2C and the first member 2A and a coupling surface S2 between the coupling member 2C and the second member 2B are in parallel to each other. Further, the coupling surfaces S1, S2 are not perpendicular to the plane passing through the rotation shaft of the third arm 3 (driven shaft 30) and the rotation shaft of the second arm 2 (driven shaft 20). That is, the coupling surfaces S1, S2 are inclined with respect to the plane perpendicular to the plane passing through the rotation shaft of the third arm 3 and the rotation shaft of the second arm 2. Furthermore, a straight line connecting the center of gravity of the coupling surface S1 and the center of gravity of the coupling surface S2 is not perpendicular to the coupling surface S1 and the coupling surface S2. That is, the coupling surfaces S1, S2 are also inclined with respect to the plane perpendicular to the straight line connecting the respective centers of gravity located on the center line of the coupling member 2C. The coupling surfaces S1, S2 are inclined as described above, and thereby, the widths and areas of the coupling surfaces S1, S2 may be made larger and rigidity may be made higher, and further, the distances between the screws used for coupling may be made larger and rigidity may be made higher. Specifically, compared to the case where the coupling surfaces are formed to be perpendicular to the center line (dashed-dotted line) of the coupling member 2C as shown by dotted lines in FIGS. 5A and 5B, the coupling surfaces S1, S2 are inclined as in the example, and thereby, the widths of the coupling surfaces S1, S2 may be made larger and the distances between screws 29 may be made larger.

In the coupling member 2C, a hollow tube 28 housing the connecting members such as electric wires and air tubes inside may be provided as shown in FIGS. 1 and 3. The hollow tube 28 is provided, and thereby, the movements of the connecting members may be restricted.

Figure 5A:
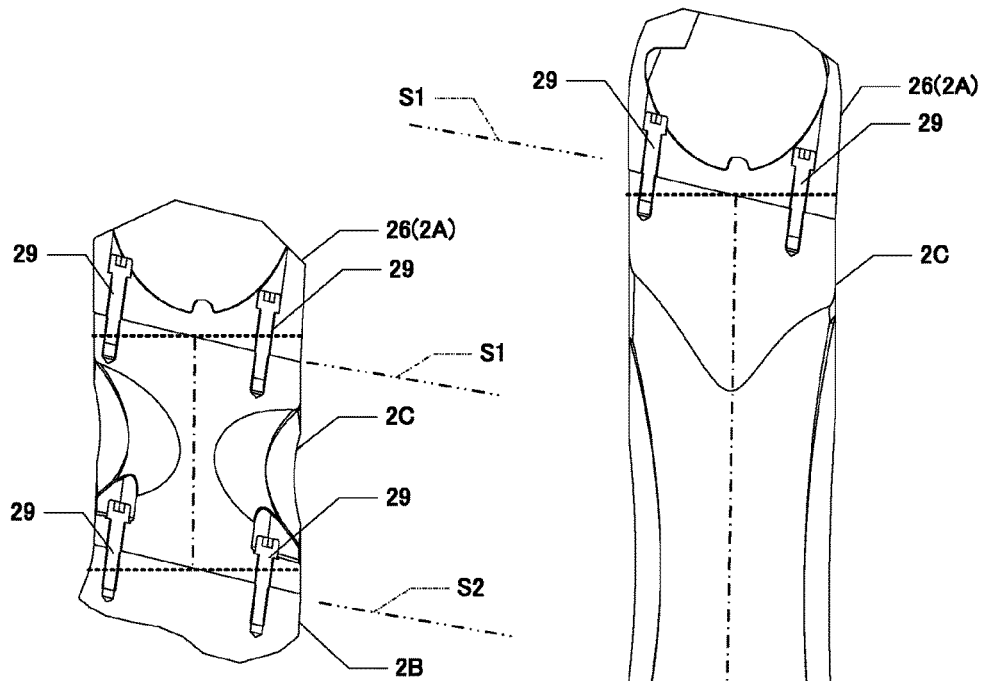
FIGS. 5A and 5B are sectional views according to the embodiment of the invention.
Figure 5B:
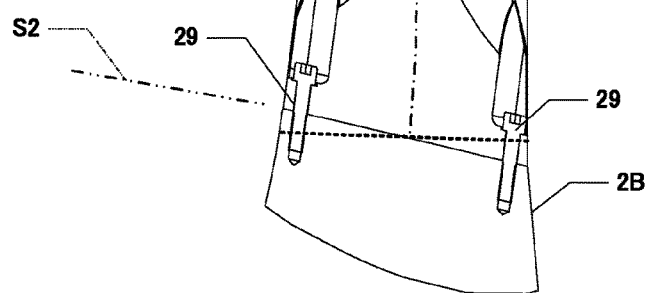

As shown in FIGS. 5A and 5B, the coupling member 2C is narrow in the center part and the contour line extending in the longitudinal direction of the projection image on a plane perpendicular to the rotation shaft of the second arm 2 is curved inwardly. Accordingly, interference between the fourth arm 4 and the coupling member 2C is harder and the rotation range of the third arm 3 may be made wider.

As shown in FIG. 1, the third arm 3 is fixed to the driven shaft 30 rotatably supported by the second arm 2 and is rotatably supported by the second arm 2 with the driven shaft 30. The third arm 3 houses a motor for rotating the fourth arm 4 etc. The rotation shaft of the fourth arm 4 is perpendicular to the rotation shaft of the third arm 3.

The fourth arm 4 includes a third member 4A as a casing at the distal end side and the coupling member 4B as a casing at the base end side. The base end of the third member 4A couples to the distal end of the coupling member 4B in the longitudinal direction of the fourth arm 4. Specifically, flat coupling surfaces are respectively formed on the base end of the third member 4A and the distal end of the coupling member 4B, the coupling surfaces are opposed and coupled by screws, and thereby, the third member 4A and the coupling member 4B are integrally coupled. S3 shown in FIG. 1 shows a coupling surface between the third member 4A and the coupling member 4B. The base end surface of the coupling member 4B forms the base end of the fourth arm 4 and faces the distal end surface of the third arm 3. The coupling member 4B houses a hollow tube 41 in which connecting members such as electric wires and air tubes pass. One end of the hollow tube 41 is open inside of the third arm 3. The other end of the hollow tube 41 is open inside of the third member 4A. The hollow tube 41 houses the connecting members such as electric wires and air tubes, and thereby, the movements of the connecting member may be restricted.

Two types of the coupling members 4B having different lengths may be coupled to the fourth arm 4. FIGS. 1 and 2 show a state in which the shorter coupling member 4B is coupled. FIGS. 3 and 4 show a state in which the longer coupling member 4B is coupled. As shown in FIGS. 1 and 3, a coupling surface S3 between the coupling member 4B and the third member 4A and a coupling surface S4 between the coupling member 4B and the third arm 3 are in parallel to each other. A straight line connecting the centers of gravity of the coupling surfaces S3, S4 is perpendicular to the coupling surfaces S3, S4.

A projection image of the fourth arm 4 on the plane perpendicular to the rotation shaft (driven shaft 30) of the third arm 3 is not bent in the longitudinal direction. That is, the fourth arm 4 has a linear shape. Accordingly, compared to the case where the arm is bent, the length of the fourth arm 4 may be made longer with respect to the volume of the fourth arm 4. Further, the second arm 2 is bent, and thereby, the rotation range of the fourth arm 4 provided closer to the hand side than the second arm 2 with respect to the second arm is made wider. That is, the second arm 2 is bent and the fourth arm 4 is formed in a linear shape, and thereby, the reachable range of the distal end of the fourth arm 4 may be made wider.

3. Other Embodiments

The technological range of the invention is not limited to the above described example and, obviously, various changes may be made without departing from the scope of the invention.

Figure 6A:
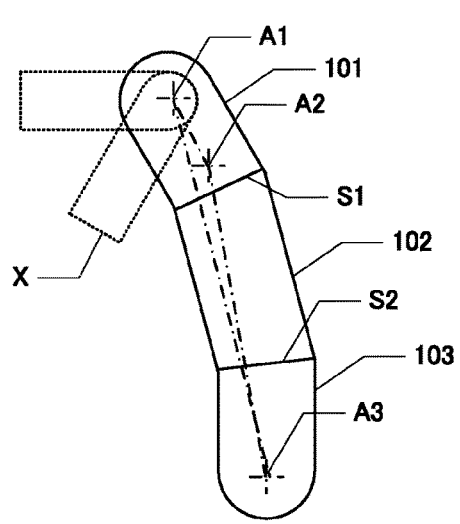
FIGS. 6A to 6D are schematic diagrams according to embodiments of the invention.
Figure 6B:
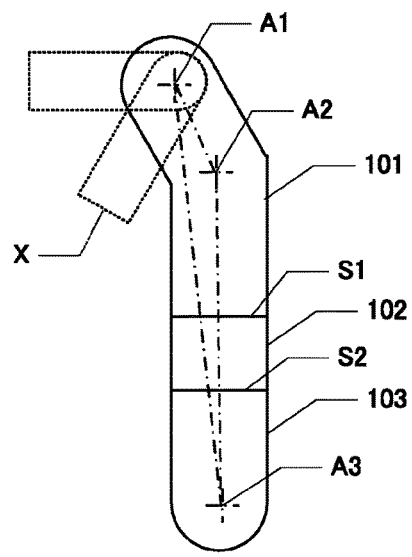
Figure 6C:
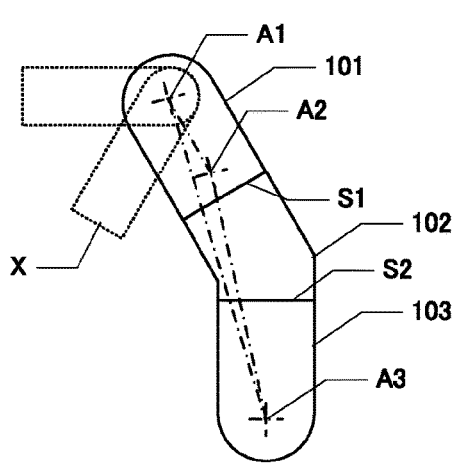
Figure 6D:
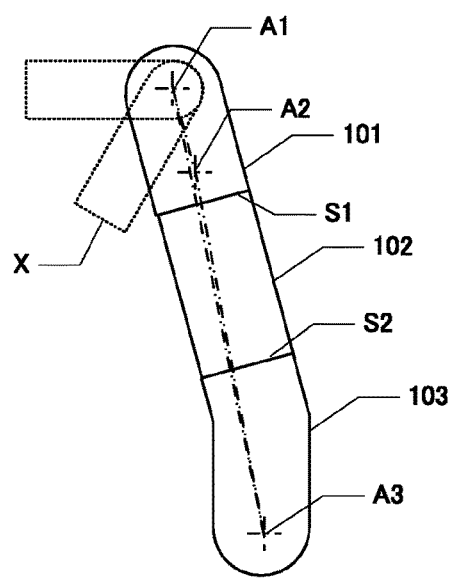

FIGS. 6A to 6D are schematic diagrams showing other embodiments of a curved arm that rotatably supports another arm X. A1 shows a rotation shaft of the other arm X, A2 shows a rotation shaft of a drive pulley for rotating the other arm X, and A3 shows a rotation shaft of the curved arm. A first member 101 houses a driven pulley, a belt, the drive pulley, and a motor and rotatably supports the other arm X. A second member 103 is fixed to a driven shaft rotatably supported by another arm (not shown) that supports the curved arm. In this regard, as shown in FIG. 6A, the first member 101, a coupling member 102, and the second member 103 may be respectively formed in linear shapes and the curved arm may be formed to bend in the longitudinal direction on coupling surfaces S1, S2. Or, as shown in FIG. 6B, the first member 101 may be bent in the longitudinal direction and the coupling member 102 and the second member 103 may be formed in linear shapes. Or, as shown in FIG. 6C, the first member 101 and the second member 103 may be formed in linear shapes and the coupling member 102 may be bent in the longitudinal direction. Or, as shown in FIG. 6D, the first member 101 and the coupling member 102 may be formed in linear shapes and the second member 103 may be bent in the longitudinal direction. In view of the wider rotation range of the other arm X, it is preferable to bend the curved arm in a region closer to the rotation shaft of the other arm X as shown in FIGS. 6A and 6B. Particularly, as an angle formed by a line segment A1-A2 and a line segment A2-A3 as shown in FIGS. 6A to 6D is larger, the rotation range of the other arm X may be made wider more easily. Note that, in the case where the other arm X is thinner in the region closer to the rotation shaft A1 and thicker in the region farther from the rotation shaft A1, even when the curved arm is bent in the region of the other arm X farther from the rotation shaft A1, the rotation range of the other arm X may be made wider as shown in FIGS. 6C and 6D.

Or, the coupling surface S1 between the first member 101 and the coupling member 102 and the coupling surface S2 between the coupling member 102 and the second member 103 may not be in parallel as shown in FIGS. 6A and 6C or may be in parallel as shown in FIGS. 6B and 6D. Or, the coupling surfaces S1, S2 may not be perpendicular to the plane passing through the rotation shafts A1, A2, the plane passing through the rotation shafts A1, A3, or the plane passing through the rotation shafts A2, A3 as shown in FIGS. 6A and 6C, may be perpendicular to the plane passing through the rotation shafts A2, A3 as shown in FIG. 6B, or may be perpendicular to the plane passing through the rotation shafts A1, A2 as shown in FIG. 6D. As shown in FIGS. 6B and 6D, the coupling surfaces S1, S2 are formed to be perpendicular to the side surfaces of the curved arm, and thereby, screws for coupling the first member 101, the coupling member 102, and the second member 103 may be provided at the outer side in the coupling surfaces S1, S2 and rigidity is easily made higher. As shown in FIGS. 6A and 6C, in the case where the coupling surfaces S1, S2 are not perpendicular to the side surfaces of the curved arm, it is necessary to separate the screws from the side surfaces of the curved arm, and thereby, the distances between the screws are smaller.

Or, for example, as shown in FIG. 7A, the coupling member 102 may be divided into a plurality of coupling units 102A, 102B, 102C, and, as shown in FIGS. 7B and 7C, the length of the coupling member may be changed by the number of coupling units coupled in the longitudinal direction of the arm. Or, as shown in FIG. 7D, the length of the curved arm in the longitudinal direction may be changed to be shorter by detachment of the coupling member. When the coupling member is detached, the base end of the first member of the curved arm is directly coupled to the distal end of the second member.

Note that the robot in which another arm is coupled to each end of the curved arm has been explained, however, the invention may be applied to the arm closest to the base. Further, the robot having the driven shaft to which the curved arm is fixed and the rotation shaft rotatably supported by the curved arm in parallel to each other has been explained, however, the invention may be applied to a robot in which these two rotation shafts are not in parallel. Or, the invention may be applied to a robot in which the curved arm and the other arm are coupled so that the other arm may be translated with respect to the curved arm and the curved arm or the other arm and the base are coupled so that the curved arm itself may be translated with respect to the curved arm and the base.

Furthermore, the robot in which the linear arm and the curved arm are directly coupled has been explained, however, the invention may be applied to a robot in which the other arm is coupled between the linear arm and the curved arm.

The entire disclosure of Japanese Patent Application No. 2014-200034, filed Sep. 30, 2014 is expressly incorporated by reference herein.

What is claimed is:

1. A robot comprising:
a first arm extending from a base; and
a second arm connected to the first arm, the second arm including a first casing, a second casing, and a coupling member,
wherein the coupling member extends along a center line,
the second arm is bent in a longitudinal direction,
the first casing is coupled to a distal end of the coupling member in the longitudinal direction,
the second casing is coupled to a base end of the coupling member in the longitudinal direction,
a first coupling surface between the coupling member and the first casing extends along a first plane, and a second coupling surface between the coupling member and the second casing extends along a second plane parallel to the first plane,
the first plane and the second plane are inclined with respect to a reference plane perpendicular to the center line of the coupling member, and
an aperture is provided in the coupling member and extends from the first coupling surface to the second coupling surface along the center line of the coupling member, such that the first coupling surface and the second coupling surface are inclined with respect to the aperture and the walls of the aperture are angled with respect to the first coupling surface and the second coupling surface.

2. The robot according to claim 1, further comprising a third arm rotatably supported by the second arm, wherein a projection image of the second arm on a plane perpendicular to a rotation shaft of the third arm is bent in the longitudinal direction.

3. The robot according to claim 1, further comprising:

a third arm rotatably supported by the second arm on a distal end of the second arm, wherein the first arm rotatably supports the second arm on a base-end side of the second arm, the first casing houses a driven pulley that rotates with a distal end-side driven shaft fixed to the third arm, a motor, a drive pulley that rotates with a rotation shaft of the motor, and a belt looped over the driven pulley and the drive pulley, a base end-side driven shaft rotatably supported by the first arm is fixed to the second casing, and a surface containing line segments connecting a rotation shaft of the third arm, a rotation shaft of the drive pulley, and a rotation shaft of the second arm is a curved surface.

4. The robot according to claim 1, further comprising a linear arm including a linear coupling member and not bending in the longitudinal direction.

5. The robot according to claim 4, coupling surfaces on ends of the linear coupling member are in parallel to each other and perpendicular to a straight line connecting respective centers of gravity thereof.

6. The robot according to claim 4, wherein the robot is configured to retain a hand at a distal end, wherein the linear arm is provided closer to a hand side than the second arm.

7. The robot according to claim 1, wherein the first casing houses a motor, a belt, and a plurality of pulleys for driving a third arm connected to the first casing.

8. The robot according to claim 1, wherein the first arm houses a motor, a belt, and a plurality of pulleys for driving the second arm, and the second casing houses a driven shaft driven by the motor, the belt, and the plurality of pulleys in the first arm.

* * * * *